(12) United States Patent
Alexander et al.

(10) Patent No.: US 12,197,402 B1
(45) Date of Patent: Jan. 14, 2025

(54) INTERACTIVE GRAPHIC DESIGN TOOL FOR CUSTOMIZED SCHEMA GENERATION

(71) Applicant: Federal Home Loan Mortgage Corporation, McLean, VA (US)

(72) Inventors: Catherine Alexander, Ashburn, VA (US); Suresh Kalkavery, Fairfax, VA (US); Jonathan Morales, Falls Church, VA (US); Pradeep Vincent, Herndon, VA (US); Stephen Olden, Lovettsville, VA (US); Ankit Goel, Oakton, VA (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 95 days.

(21) Appl. No.: 17/376,587

(22) Filed: Jul. 15, 2021

(51) Int. Cl.
| | | |
|---|---|---|
| *G06F 16/00* | (2019.01) | |
| *G06F 8/30* | (2018.01) | |
| *G06F 16/21* | (2019.01) | |
| *G06F 16/242* | (2019.01) | |
| *G06F 16/25* | (2019.01) | |
| *G06F 3/0486* | (2013.01) | |
| *G06Q 10/10* | (2023.01) | |
| *G06Q 10/101* | (2023.01) | |

(52) U.S. Cl.
CPC ............ *G06F 16/212* (2019.01); *G06F 8/30* (2013.01); *G06F 16/242* (2019.01); *G06F 16/258* (2019.01); *G06F 3/0486* (2013.01); *G06Q 10/101* (2013.01); *G06Q 10/103* (2013.01)

(58) Field of Classification Search
None
See application file for complete search history.

(56) References Cited

U.S. PATENT DOCUMENTS

| | | | |
|---|---|---|---|
| 7,526,494 B2 * | 4/2009 | Rom | G06Q 30/00 |
| 7,698,398 B1 * | 4/2010 | Lai | G06Q 30/00 709/228 |
| 7,831,693 B2 * | 11/2010 | Lai | H04L 67/02 709/218 |
| 8,069,435 B1 * | 11/2011 | Lai | H04L 67/51 717/106 |

(Continued)

*Primary Examiner* — Farhan M Syed
(74) *Attorney, Agent, or Firm* — MH2 Technology Law Group, LLP

(57) ABSTRACT

A system for automated generation of a schema based on a plurality of artifacts is provided. The system includes a centralized artifact repository storing the artifacts and metadata characterizing each artifact and a computing device. The computing device performs operations including receiving user input indicating an application container, obtaining, from the repository, the metadata for artifacts of the plurality of artifacts, providing, via the display, the metadata, receiving a user selection of an artifact of the plurality of artifacts for inclusion with the application container, storing the application container in association with the selected artifact in an application repository, receiving a schema request related to the application container, obtaining a schema format selection, based on the request, generating a schema based on the schema format selection, the application container, and the artifact associated with the application container, and providing the schema in the selected schema format.

20 Claims, 13 Drawing Sheets

(56) References Cited

U.S. PATENT DOCUMENTS

| | | | | |
|---|---|---|---|---|
| 8,346,929 | B1* | 1/2013 | Lai | H04L 67/51 |
| | | | | 709/226 |
| 9,430,549 | B2* | 8/2016 | Guo | G06F 16/256 |
| 9,922,012 | B1* | 3/2018 | Wang | G06Q 30/04 |
| 2005/0044197 | A1* | 2/2005 | Lai | H04L 67/02 |
| | | | | 709/223 |
| 2005/0193029 | A1* | 9/2005 | Rom | G06Q 30/00 |
| 2012/0030650 | A1* | 2/2012 | Ravindran | G06F 8/20 |
| | | | | 717/107 |
| 2014/0279837 | A1* | 9/2014 | Guo | G06F 16/282 |
| | | | | 707/603 |
| 2018/0121260 | A1* | 5/2018 | Nadig | G06F 16/212 |
| 2019/0384783 | A1* | 12/2019 | Malak | G06F 16/3322 |
| 2021/0117445 | A1* | 4/2021 | Guo | G06F 16/2428 |

\* cited by examiner

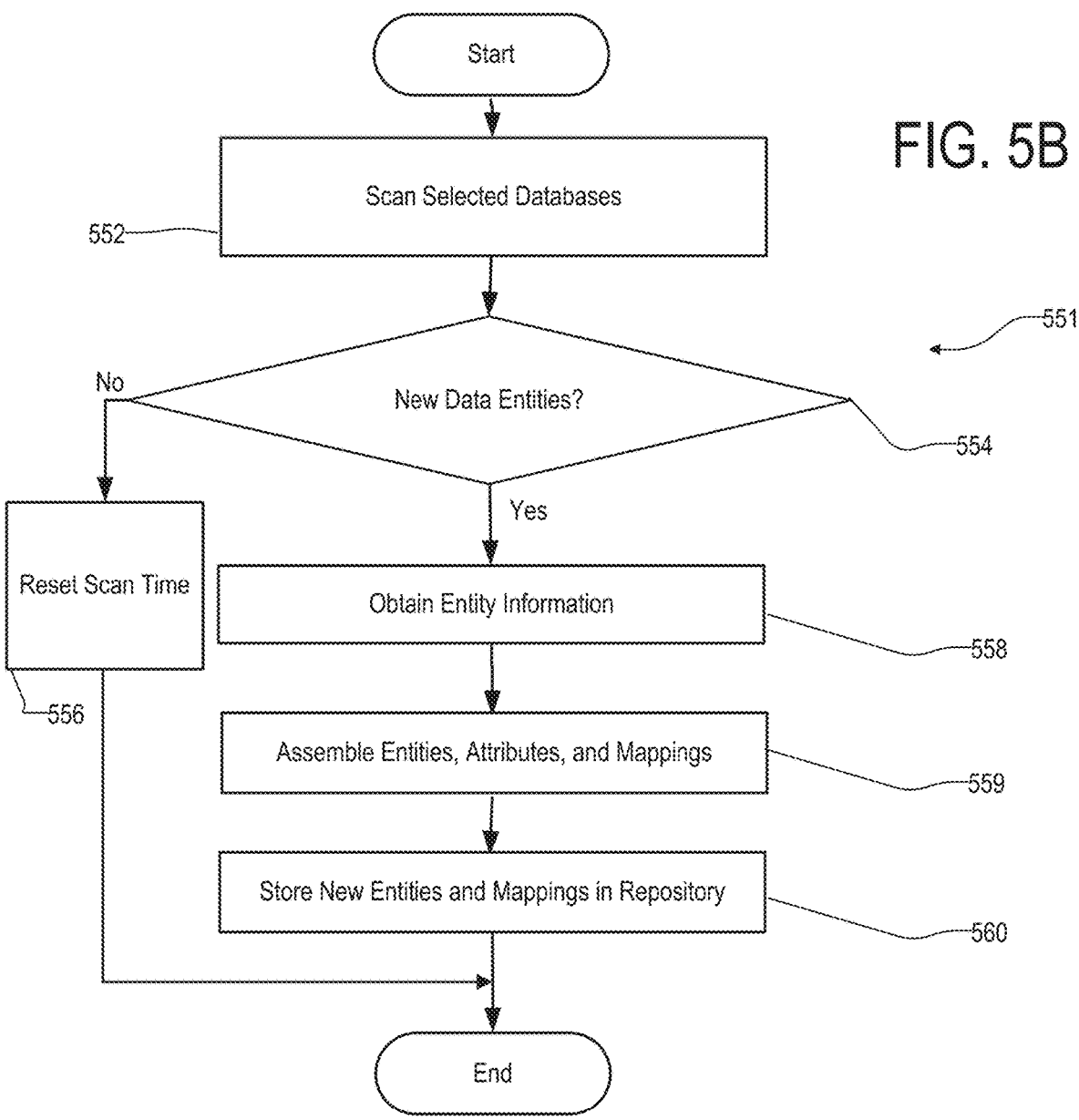

INTERACTIVE GRAPHIC DESIGN TOOL FOR CUSTOMIZED SCHEMA GENERATION

FIELD OF THE DISCLOSURE

The present disclosure relates to data schemas, and more particularly to systems and methods facilitating graphic design and automated generation of customized schemas from an array of objects in a repository.

BACKGROUND OF THE DISCLOSURE

In many organizations, data plays an important role and can be one of the more valuable assets held within the organization. Throughout the lifecycle of project development, multiple parties both within and outside the organization may seek to leverage available data and associated structures for facilitating and accelerating time to completion of one or more data-consuming/generating applications. For example, analysts, developers, programmers, and even business-oriented parties operating under, for example, a continuous integration/continuous development ("CI/CD") environment may desire to expedite release of mission critical applications.

The amounts of data and the data architectures used by an organization are often vast, varied, and complex, particularly in larger organizations. This can lead to difficulties in the design of an application consuming and/or generating data, especially when the data comes from multiple sources and structures. In addition, such complexity can lead to redundancy, for example, when one team has already developed a data model having a number of logical objects corresponding to a data architecture, and another team duplicates that work for a separate application. Redundancy consumes technical resources, including storage media, bandwidth, and processing time.

To aid in avoiding such redundancy, an organization may have a fixed number of individuals (e.g., data specialists) who may be tasked with understanding and building data architectures and logical systems for any particular application. These data specialists, over time, acquire significant knowledge of both the organization and the associated data leading to concentration of knowledge, that if lost by the organization (e.g., via retirement, termination of employment, etc.) can lead to errors and extended time for future application design, development and rollout, which may not fit well within the CI/CD pipeline environment.

In addition, such concentration of knowledge may further render other team members unable to perform tasks that may be desirable for expediting application development and rollout, because these team members may be left waiting for the data specialists to prepare desired schema from requirements prepared by an analyst or other party.

SUMMARY OF THE DISCLOSURE

The present inventors have recognized that it may be desirable to provide a tool enabling rapid design and development of data schema for applications and the like, by any member of a project team, and without special knowledge obtained in advance. The present inventors have further recognized the desirability of providing a graphical user interface that organizes and manages the large amount of data and different data architectures and schemas within an organization for efficient use by developers.

In addition, the present inventors have recognized that rapid generation of a logical data architecture from pre-existing object definitions may aid in facilitating rapid development in, for example, a CD/CI pipeline environment. Moreover, by ensuring that pre-existing object definitions as well as descriptions of such definitions, are available for any consumer, architecture and schema development can be performed by anyone at any time, as desired. The resulting schemas and associated architectures can then be made available on any desired scale (e.g., team, enterprise, public, etc.)

According to embodiments of the present disclosure, a system for automated generation of a schema based on a plurality of artifacts, is provided. The system includes a centralized artifact repository storing the plurality of artifacts and metadata characterizing each artifact of the plurality of artifacts, a computing device including a processor, a display, and a non-transitory storage medium comprising instructions that when executed by the processor cause the processor to perform operations. The operations include receiving user input indicating an application container, obtaining, from the centralized artifact repository, the metadata for one or more artifacts of the plurality of artifacts, providing, via the display, the metadata for the one or more artifacts, receiving a user selection of an artifact of the plurality of artifacts for inclusion with the application container, storing the application container in association with the selected artifact in an application repository, receiving a schema request related to the application container, obtaining a schema format selection from among a plurality of available formats, based on the request, generating a schema based on the schema format selection, the application container, and the artifact associated with the application container, and providing the schema in the selected schema format in response to the schema request.

Each artifact of the plurality of artifacts may be defined by one or more attributes mapped to a database, and the metadata for a respective artifact may include information related to the one or more attributes and the mapping.

The operations may further include receiving information defining a custom attribute for the selected artifact, and automatically mapping the custom attribute to a respective data column of the database for the application container.

The operations may further include receiving information indicating deletion of an attribute from the selected artifact, and automatically removing the mapping between the deleted attribute of the selected artifact and the database for the application container.

The plurality of available formats may include two or more of JavaScript Object Notation ("JSON"), extensible markup language ("XML"), Java, microdata, and Resource Description Framework in Attributes ("RDFa").

The storing may include receiving an instruction to publish the application container, and assigning a version identifier to the application container.

The operations may further include receiving one or more keywords related to a desired artifact, formulating a query using the one or more keywords, and obtaining the metadata for one or more artifacts of the plurality of artifacts based on the query.

The operations may further include generating source code in a desired language, the source code defining the application container and selected artifact in the desired language.

Receiving the user selection of the artifact may include dragging and dropping the artifact.

The operations may further include receiving a request to provide information regarding one or more of the application container and the plurality of artifacts, and providing at least a portion of the metadata of an artifact in response to the request.

According to further embodiments of the disclosure, a method for automated generation of a schema based on a plurality of artifacts, is provided. The method includes receiving, via a graphical user interface ("GUI"), user input indicating an application container, obtaining, from a centralized artifact repository, metadata associated with one or more artifacts of the plurality of artifacts, providing, via the GUI, the metadata for the one or more artifacts, receiving, via the GUI, a user selection of an artifact of the plurality of artifacts for inclusion with the application container, storing the application container in association with the selected artifact in an application repository, receiving a schema request related to the application container, obtaining a schema format selection from among a plurality of available formats, based on the request, generating a schema based on the schema format selection, the application container, and the artifact associated with the application container, and providing the schema in the selected schema format in response to the schema request.

Each artifact of the plurality of artifacts may be defined by one or more attributes mapped to a database, and the metadata for a respective artifact may include information related to the one or more attributes and the mapping.

The method may further include receiving information defining a custom attribute for the selected artifact, and automatically mapping the custom attribute to a respective data column of the database for the application container.

The method may further include receiving information indicating deletion of an attribute from the selected artifact, and automatically removing the mapping between the deleted attribute of the selected artifact and the database for the application container.

The plurality of available formats may include two or more of JavaScript Object Notation ("JSON"), extensible markup language ("XML"), Java, microdata, and Resource Description Framework in Attributes ("RDFa").

The storing may include receiving an instruction to publish the application container, and assigning a version identifier to the application container.

The method may further include receiving one or more keywords related to a desired artifact, formulating a query using the one or more keywords, and obtaining the metadata for one or more artifacts of the plurality of artifacts based on the query.

The method may further include generating source code in a desired language, the source code defining the application container and selected artifact in the desired language.

Receiving the user selection of the artifact may include dragging and dropping the artifact.

The method may further include receiving, via the GUI, a request to provide information regarding one or more of the application container and the plurality of artifacts, and providing at least a portion of the metadata of an artifact in response to the request, is provided.

By providing such a system, novel visual modelling of schemas using enterprise entities becomes possible, and consistency of schema and code generation across the enterprise can be achieved. In addition, central version-controlled management of models/schemas is enabled, while also expanding the user base to developers, architects and product analysts, among others.

Further, the recited system allows the creation of multiple schema artifacts such as JSON, XSD/XML, and Application Code and can further support other schema technologies like Parquet and YAML.

Moreover, seamless editing of models/schemas can be achieved while also enabling the automated merging of two schemas for an application and/or a microservice, or the like.

Overall, a reduction in time taken to generate schemas and code can aid in reaching Agile software development environment goals and the reduction in redundancy (e.g., by allowing individuals to see what data already exists and where it is located, such that new data structures that duplicate existing data are not created), reduces the memory usage and digital storage needs of an organization as well as overall quality of the data.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF THE DRAWINGS

FIG. 5B is a flowchart illustrating a method for generating a backend repository facilitating schema design according to embodiments of the present disclosure.

DESCRIPTION OF THE EMBODIMENTS

Reference will now be made in detail to various embodiments of the disclosure, examples of which are illustrated in the accompanying drawings. Wherever possible, the same reference numbers will be used throughout the drawings to refer to the same or like parts.

The disclosed embodiments may provide one or more of the features and benefits mentioned above and/or various additional and/or alternative features and benefits that will be made apparent herein.

According to embodiments of the present disclosure, systems and methods enable the visualization, rapid design, and custom generation of schema in virtually any desired format, by harnessing existing data structure/model/entity/component archive(s) of an enterprise. Embodiments of the disclosure provide a user interface ("UI") (e.g., client server, web based, etc.) to graphically model the schemas (e.g., using drag and drop, click and create, etc.), as well as the ability to modify and manage schema versioning. According to embodiments of the present disclosure, multiple schema models may be merged (e.g., from various versions), and when ready, code can be generated and provided to a desired repository for use or consumption by one or more applications and/or microservices or the like.

The terms "entity" and "artifact" are used herein interchangeably, and should be understood to mean any code-based implementation of a collection of properties/attributes corresponding to one or more data elements stored in a database and/or data model. For example, an "object" implemented in code, having a referenceable identifier, and containing attributes corresponding to data columns of a data table in a database and/or data model is one form of an entity/artifact. The attributes of such an entity/artifact may further include publicly exposed methods and functions (e.g., corresponding to database stored procedures) and one or more child entities/artifacts contained by the implementation, and including additional attributes. Each entity/artifact may further include metadata providing information describing the entity/artifact and the attributes included therein, as well as mapping information related to links between variables of the entity and columns of a data table, for example. Such metadata may be stored in the entity/artifact implementation alternatively, or in addition, to being stored in the database and/or data model for reference by a user, among others.

Figure 1:
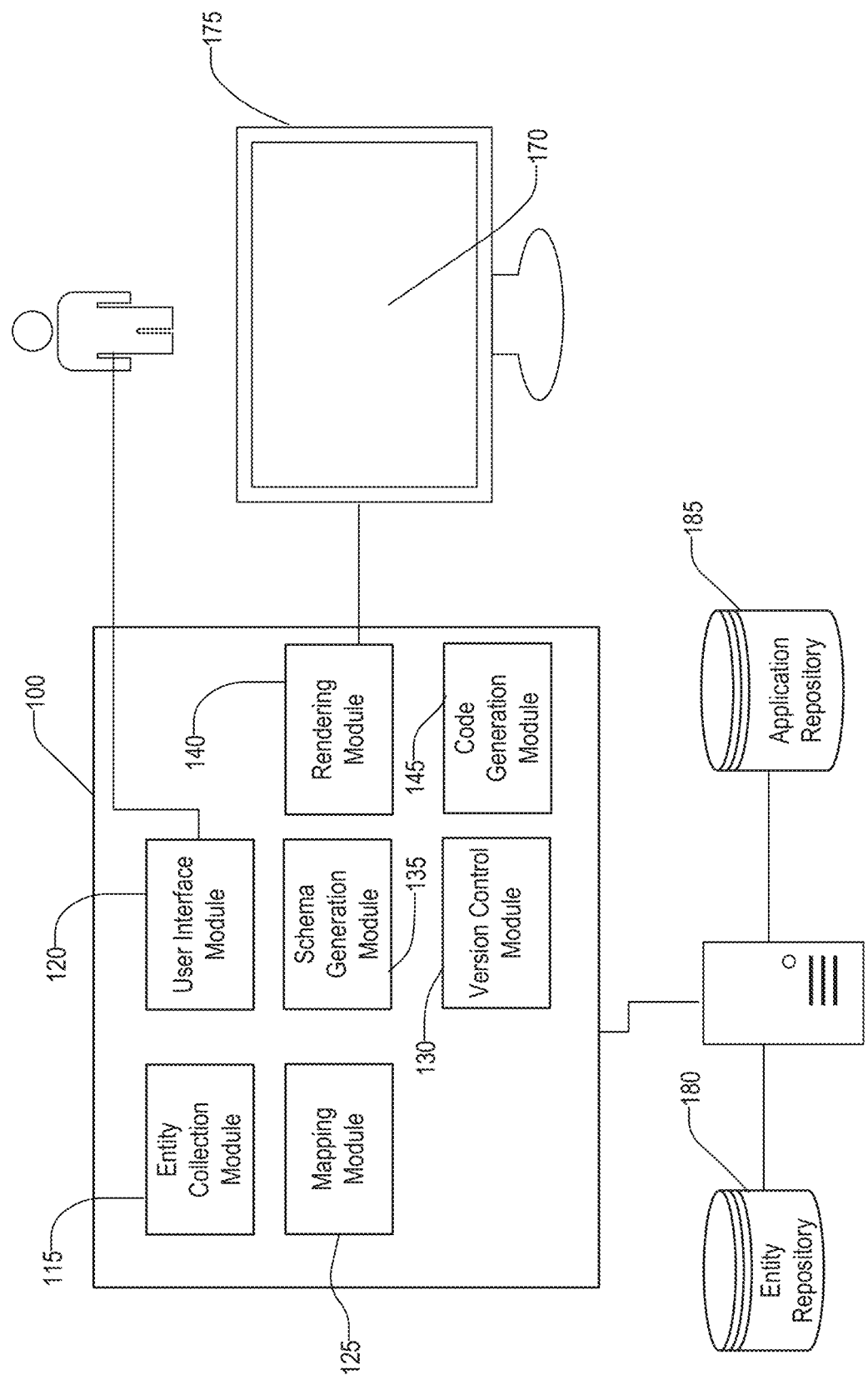
FIG. 1 is a schematic diagram of an exemplary system according to embodiments of the present disclosure.

FIG. 1 is a schematic diagram of an illustrative system 100 for displaying, designing, and generating schema according to embodiments of the present disclosure. System 100 may be implemented on any suitable computing device, such as, for example, a personal computer, a server, etc. System 100 may comprise a processor and a non-transitory memory, as will be described in greater detail below, the memory storing instructions related to one or more software modules for carrying out functions, methods, and operations of the present disclosure. According to some embodiments, the system 100 may comprise an entity collection module 115, a user input interface module 120, a mapping module 125, a version control module 130, a schema generation module 135, a rendering module 140, and a code generation module 145, among others. System 100 may further comprise one or more of an entity repository 180 and an application repository 185, as well as, for example, a display 175 presenting a user interface 170 to a user.

The display 175 and the rendering module 140 may be configured to cooperate to present the user interface 170 to a user via the display 175. The display 175 may be any suitable display, for example, an LED display (e.g., including touchscreen functionality, mouse functionality, keyboard functionality, etc.), for presenting images and text to a user, and allowing a user to interact with the user interface 170, e.g., to enter and select and manipulate images and text.

The user interface module 120 may be configured to receive input from a user (e.g., via the user interface 170) and provide the input information to the system 100. For example, the user interface module 120 may be tasked with providing the user interface elements displayed at the user interface 170 on the display 175 via, for example, the rendering module 140. Interface elements provided by the user interface module 120 may include for example, text boxes, list boxes, tab controls, buttons, hierarchy representations, etc., and such elements may be populated by information (e.g., metadata) originating from the entity repository 180.

A user may create a new or open an existing application container via the user interface 170 in conjunction with the user interface module 120 within which the data model may be stored. The term "application container" used herein, should be understood to mean a referenceable element having a data model defined therein grouping one or more entities/artifacts created for purposes of enabling data consumption and/or entry by a data consumer (e.g., an application or a microservice or the like). For example, a user may indicate via a keyboard, a mouse, voice commands, etc. a desire to open or create an application container, and may, where prompted, provide a referenceable identifier for the application container. The user interface module 120 may be configured to use the identifier to create a new application container or to open an existing application container for which schema is to be or has been created.

The entity repository 180 may be configured to store one or more data entities available for use within one or more application containers, for example, as defined by an enterprise data model or otherwise used by an enterprise(s). Such entities may comprise, for example, logical objects corresponding to one or more data tables, data views, stored procedures, etc. The data corresponding to the data tables, data views, stored procedures, etc. may be stored in any suitable data structure or database (e.g., a relational database, a flat file structure, an object database, etc.) Each logical object may include one or more attributes and associated source code for carrying out functionality associated with the respective logical object. For example, each logical object may comprise a plurality of variables, functions, methods, etc. corresponding to various aspects of a data structure stored in the database (e.g., an enterprise database 550). In addition, child entities may form part of the attributes associated with a parent entity. For example, an "Accounting" entity may include an attribute that is another distinct entity identified by "Account."

The entity repository 180 may further store one or more mappings between the entities, for example, parent/child mappings, foreign key mappings, variable constraints, etc. Such mappings may be obtained from the database (e.g. the database 550) and/or a data model and the associated entities therein, as will be described in greater detail below.

The entity repository 180 may further store metadata associated with each entity stored therein, and the metadata may provide information related to attributes of a respective entity. For example, each logical object stored in the entity repository 180 may include metadata indicating a name and a description of the logical object including, for example, attributes of the logical object. According to some embodiments, the attributes of an entity stored within the entity repository 180 may be described in a manner such that a user may readily ascertain the purpose and data mappings associated with the entity under consideration. Importantly, storage of the metadata in the entity repository 180 is intended as illustrative, and such metadata may be stored in any suitable location without departing from the scope of the present disclosure.

The entity collection module 115 may be configured to obtain metadata for one or more entities stored in the entity repository 180, and to provide the obtained metadata to one or more other modules of system 100 (e.g., the user interface module 120, the rendering module 140, etc.). For example, the entity collection module 115 may be configured to receive an application definition from a user, and to formulate a query to identify entities within the entity repository 180 that correspond with the application definition provided by the user.

Alternatively, or in addition, the entity collection module 115 may provide metadata for all available entities stored in the entity repository 180 and may allow a user to filter and/or search (e.g., based on keywords related to functionality and/or data attributes) the provided entities within the user interface to find a desired entity. For example, upon creation of a new application container (as will be described in greater detail below) the entity collection module 115 may return metadata for all entities available in the entity repository 180. A user may then input search criteria, including, for example, keywords for desired data attributes, via the user interface module 120 to identify one or more entities from the entity repository 180 based on the metadata.

The mapping module 125 may be configured to obtain mapping information related to each of the entities obtained from the entity repository 180, among others, and to assign new mapping information received from, for example, the user interface module 120. For example, the mapping module 125 may obtain from the entity repository 180 information indicating attribute/field mappings, foreign key mappings, view mappings, etc. for one or more of the entities being implemented within an application container, as will be described in greater detail below.

The version control module 130 may be configured to provide functions governing versioning control and publication for one or more schema generated by the system 100. For example, the version control model 130 may be configured to interface with the application repository 185 to manage a status of a schema, for example, from unpublished to published, as well as assigning a version identifier to new or revised versions of a published schema, as desired. As will be described in greater detail below, a schema may remain un-versioned until such schema is published to the application repository 185. Subsequent modifications to the schema and publication thereof may result in a new version of the schema, and the version control module 130 may increment a previous version number and assign the incremented version number to the new version of the schema and then store it in the application repository 185.

The schema generation module 135 may be configured to take the one or more entities selected for an application container and to automatically generate a schema in a selected format. For example, the schema generation module 135 may be configured to generate a schema in JavaScript Object Notation ("JSON"), extensible markup language ("XML"), Java, microdata, Resource Description Framework in Attributes ("RDFa"), Parquet, and/or yaml ain't markup language ("YAML"), among others.

The schema generation module 135 may be configured to cooperate with external tools to provide additional functionality with regard to schema generation. For example, the schema generation module 135 may use application programming interfaces available in a formatting tool to obtain a desired schema output based on the application container and selected entities.

The code generation module 145 may be configured to generate source code corresponding to and/or one or more artifacts stored with the application container. For example, the one or more artifacts configured as logical objects having attributes and functionality for performing, for example, business logic, may be assembled by the code generation module 145 and associated code in a desired language (e.g., Java, C#, etc.) may be generated based on the attributes and business logic associated with each logical object to produce a framework of code for the application container.

Similarly to the schema generation module 135, the code generation module 145 may be configured to cooperate with one or more third-party tools via, for example, an API to aid in the generation of source code for the one or more logical objects. For example, for each entity associated with an application container, the code generation module may pass identifiers and attributes to an API of a third-party tool along with a desired language for code generation (e.g., Java). The API of the third-party tool may then return a baseline coded object for each of the entities of the application container.

The entity collection module 115, user input module 120, mapping module 125, version control module 130, schema generation module 135, rendering module 140, and code generation module 145 may be implemented in any suitable manner and with any suitable development tool. For example, the modules may be coded in any suitable language, including, but not limited to, C, C++, Java, Basic, Python, etc. Further, any suitable framework may be used for implementing the modules. For example, the .NET framework provided by Microsoft Corporation, the XCode framework provided by Apple, Inc., and/or the JRE framework provided by Oracle Corporation.

The modules implemented herein need not be implemented in one single, uniform language, and certain modules may be implemented in a first language and/or framework, while other modules may be implemented in another, second language and/or framework. For example, the user interface module 120 may be implemented in C++, while the code generation module 145 may be implemented in Python.

Figure 2:
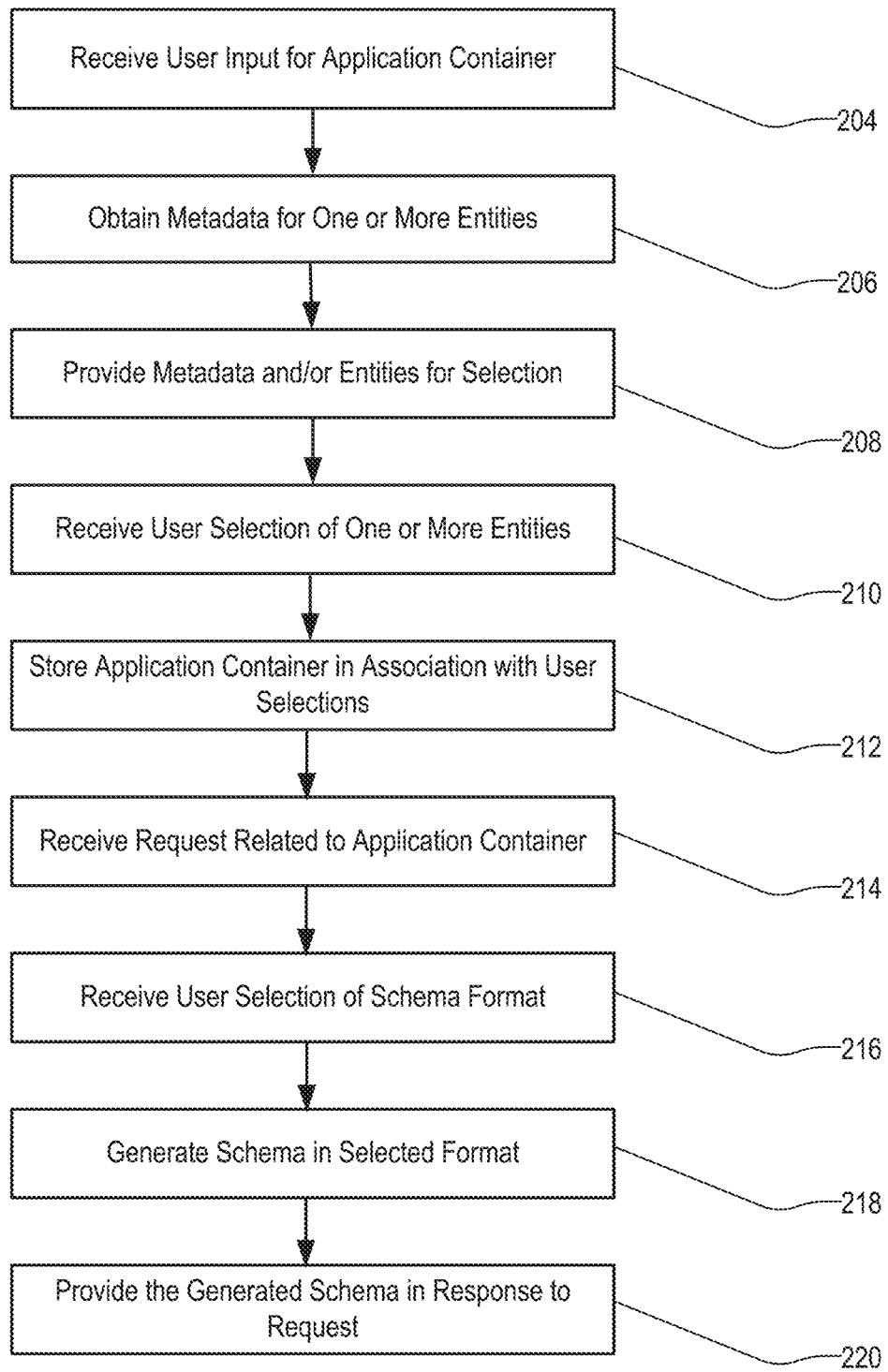
FIG. 2 is a flowchart illustrating a method for designing and generating schema according to embodiments of the present disclosure.

FIG. 2 is a flowchart illustrating a method for designing and generating schema according to embodiments of the present disclosure and will be referred to in conjunction with FIGS. 3A-3G, which illustrate a graphical user interface for facilitating custom schema design and generation according to embodiments of the present disclosure.

According to some embodiments a user may first initiate a session of the schema generation tool by logging into the system 100 using credentials previously provided by the user or otherwise provided by a system administrator (e.g., username/password, certificate, etc.) The login procedure may be performed by any suitable process, and such login procedures being well known, will not be described in greater detail herein.

Figure 3A:
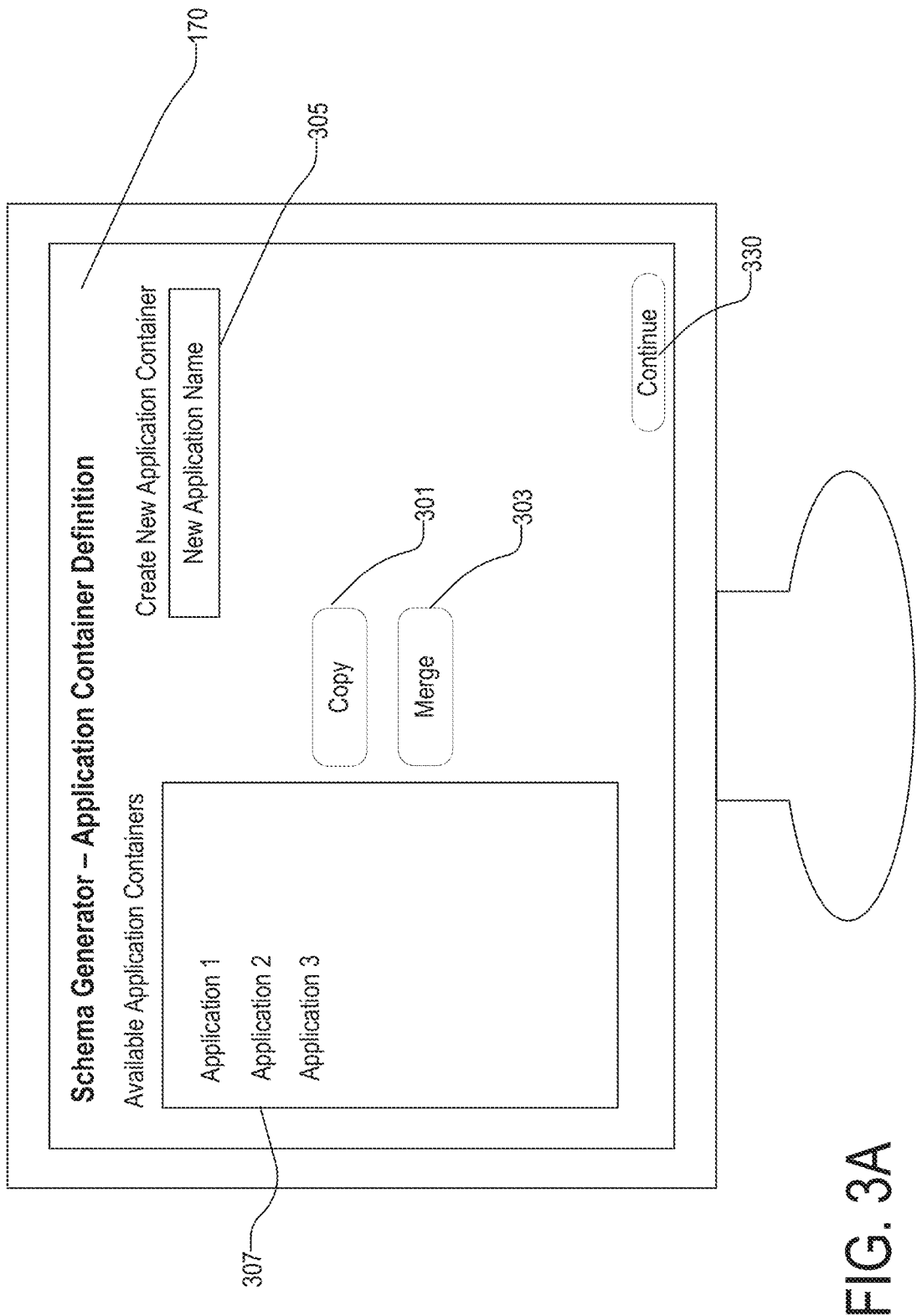
FIGS. 3A-3G illustrate a graphical user interface for facilitating schema design and generation according to embodiments of the present disclosure.

Following initiation of a session, a user may provide input to the system related to an application container to be used during a session, via the user interface (operation 204). FIG. 3A illustrates an example of a graphical user interface 170 that may be provided to the user via the display 175 for input of application container information. As shown at FIG. 3A, a user may be presented with a number of pre-existing available application containers at an application container list box 307. A user may select one or more of the existing application containers and may elect to work from a copy of such a container using, for example, a copy function attached to or activated by a copy button 301, or to merge multiple application containers selected by the user using a merge function tied to or activated by for example, a merge button 303.

Notably, existing application containers may include a status indicator (not shown) indicating the status of the application container. In various embodiments (not shown), the status indicator may be in the form of additional text, letter color, font, an icon, or the like. An application container that has not yet been published by its creator for consumption, may exist as a "draft" application container; i.e., it may have a "draft" status indicator. In addition, application containers having been published by their respective creator may have a status indicating "published" and may further indicate a version identifier provided by version control module 130 at time of publication. A user may be prohibited from modifying a published application container including a version identifier, but may start from a published application container as a template (e.g., via the copy function), where desired. In such a case, upon subsequent publication, the user may choose to have the version control module 130 assign a new version number, or to store and publish the application container as a completely new application container (e.g., version 1.0).

Alternatively, a user may provide a new application container identifier via, for example, new application container name text box 305, and proceed to create a new application container. In some embodiments, the user interface module 120 may be configured to search the schemas repository 185 for an application container having an identifier similar to that provided by the user. If the identifier, or a similar identifier, is found in the application repository 185, then the user interface module 120 and/or other suitable components, may cause the system 100 to suggest or even load the application container that was found (see 206) for manipulation by the user. If the identifier (or something similar) is not found in the application repository 185, then the user interface module 120, and/or other suitable components of the system 100, may cause the system 100 to create a new application container having, as an identifier, that identifier provided by the user via 305.

Where the user has elected to copy an existing application container, the system may create a new application container having all of the entities and attributes of the selected application container, but provided with a new identifier. Similarly, where the user has elected to merge two or more application containers, the system may create a new application container containing all the entities and attributes of the multiple selected applications, and may assign a new identifier to allow the user to begin customization of the new application container.

Once a user has created or opened an application container for editing, the system may access, present, and/or obtain metadata and other related information for entities available to the system for inclusion within that application container from the entity repository 180 (operation 206). For example, the user interface module 120 may communicate with the entity collection module 115 and request that the entity collection module 115 retrieve the metadata related to the one or more entities from the entity repository 180. According to such an example, the entity collection model 115 formulates a query based on, for example, the identifier associated with the application container provided by the user interface module 120, and uses this query to retrieve potentially relevant entity(ies) from the entity repository 180. Alternatively, or in addition (e.g., based on a user request) the entity collection module 115 may retrieve all available entities from the repository 180 (e.g., in a dataset) for perusal and selection by the user.

Figure 3B:
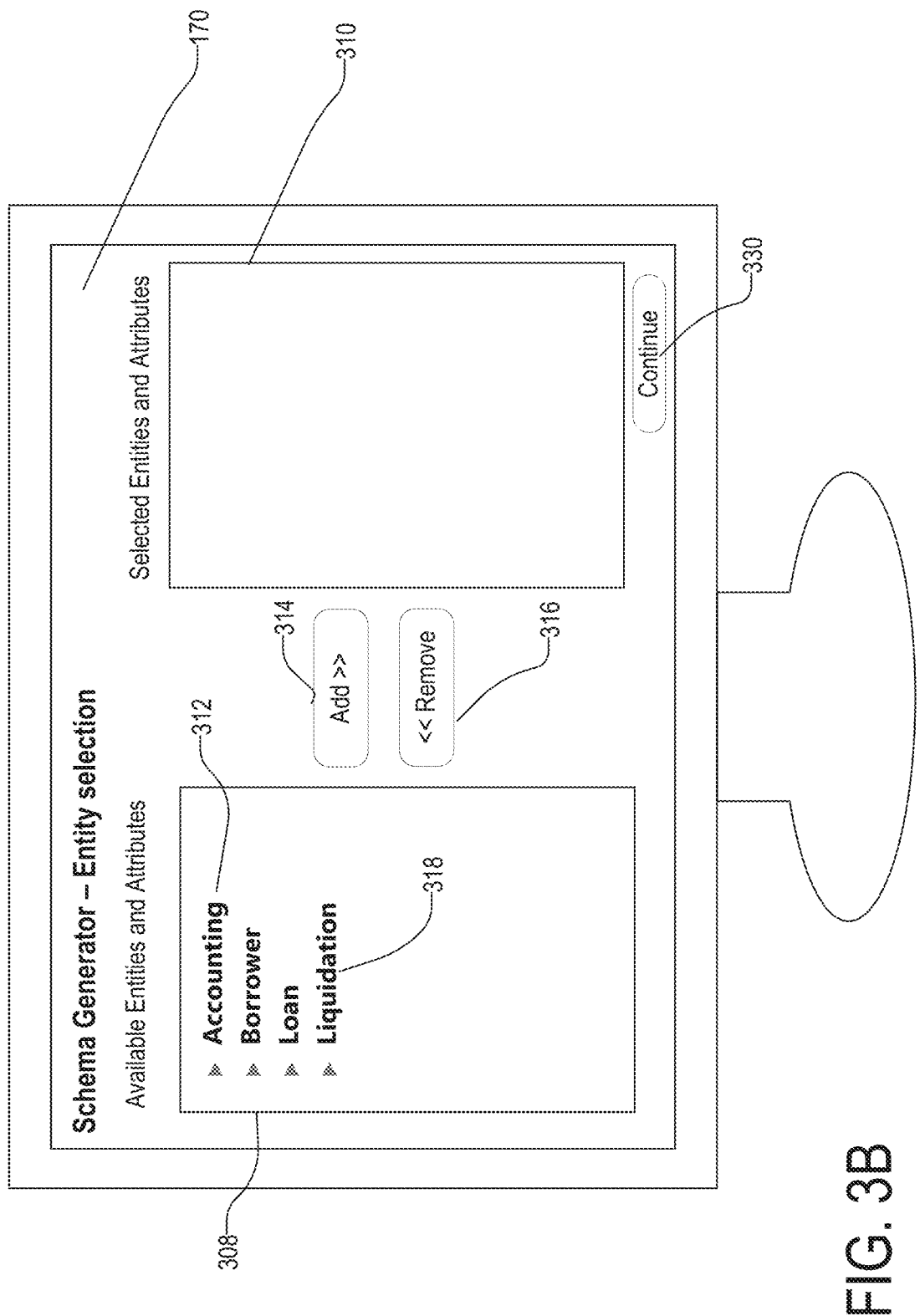

The available entity information may be provided via, for example, an entity selection box 308, as shown at FIG. 3B (operation 208). For example, the user may be presented with each available entity via a hierarchy, a list (e.g., a tree list), or the like, which enables the user to explore the entities and their subparts, sub-entities, or the like, provided therein. Using various controls of the user interface 170, a user may "drill down," i.e., expand one or more entities and/or attributes or other subparts for each available entity, to learn more about the entity, its attributes, and its potential use within the application container currently being architected, as shown at FIG. 3C.

Figure 3C:
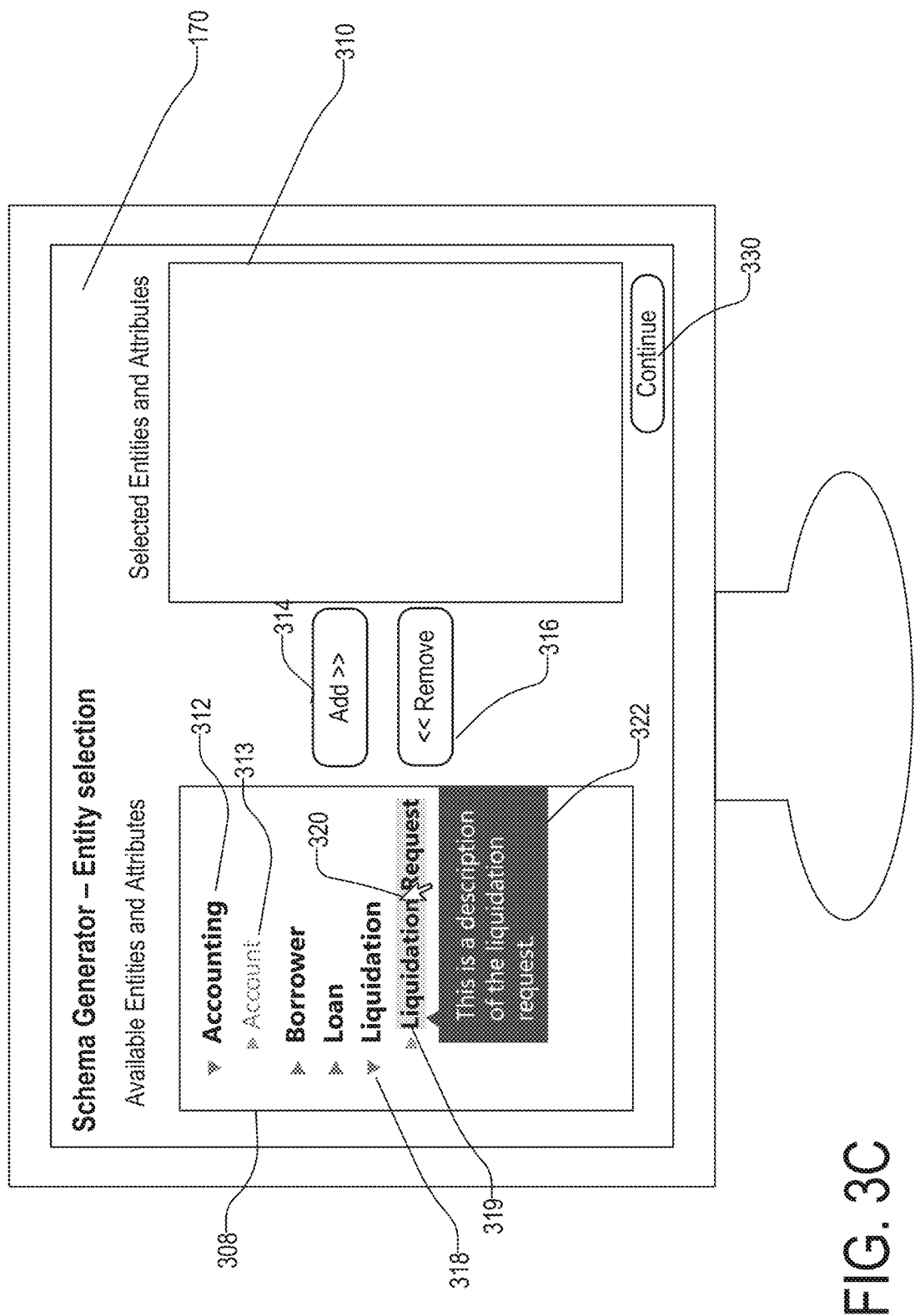

In the example shown in FIG. 3C, an "Accounting" entity 312 has been expanded to reveal an "Account" entity 313 as a subpart or child entity of the Accounting entity 312. The Account entity 313 could be further expanded by a user (e.g., by clicking on the triangle next to "Account" on the UI 170) to reveal additional subparts, sub-entities, or attributes of the Account entity 313. Similarly, a "Liquidation" entity 318 has been expanded by the user to reveal a "Liquidation Request" child entity 319, this entity being presently highlighted by the user of the user interface 170 using the cursor 320.

According to some embodiments, as shown at FIG. 3C, a user may obtain additional information regarding the currently highlighted entity. For example, the user interface module 120 may cause rendering module 140 to provide a "tooltip" 322 to a user who is hovering the cursor 320 over and/or right clicking on an entity within entity selection box 308. Alternatively, or in addition, user action on an entity may cause the user interface module 120 to create a pop-up window or other suitable text or graphical feature or control for providing additional information to the user regarding the entity or the like under consideration, via user interface 170. The additional information may provide guidance to the user as to what the entity is or represents and how and where the entity of interest may be used, as well as providing other information, (e.g., existing attributes, etc.). One of skill will recognize that any suitable method for providing a user additional information regarding an entity may be implemented without departing from the scope of the present disclosure.

During user exploration of the one or more entities, the mapping module 125 may provide information related to mappings between the attributes of an entity under consideration by the user, and, for example, the data table columns of the database (e.g., 550) and/or data model, among others. The user interface module 120 and the rendering module 140 may provide the information for rendering within the user interface 170 for viewing by the user.

When a user has identified an entity desired for addition to the application container (e.g., based on a review of the metadata), a user selection of the entity for inclusion within the application container may be received (operation 210), which may be thought of as a way of creating a customized application container. For example, a user may use the cursor 320 to "drag and drop" the desired entity from the entity selection box 308 to the selected entity box 310. Alternatively, or in addition, a user may select (e.g., highlight) the desired entity in the entity selection box 308, and then click the add button 314 to move or copy the entity from the entity selection box 308 to the selected entity box 310. Where a user desires to deselect an entity, a drag and drop process the reverse of that for adding may be used, or the remove button 316 may be used to remove a selected object from the selected object box 310, thereby disassociating the entity from the present application container.

One of skill will recognize that any suitable method for selecting and deselecting an entity and associating the entity with the present application container may be implemented without departing from the scope of the present disclosure.

Figure 3D:
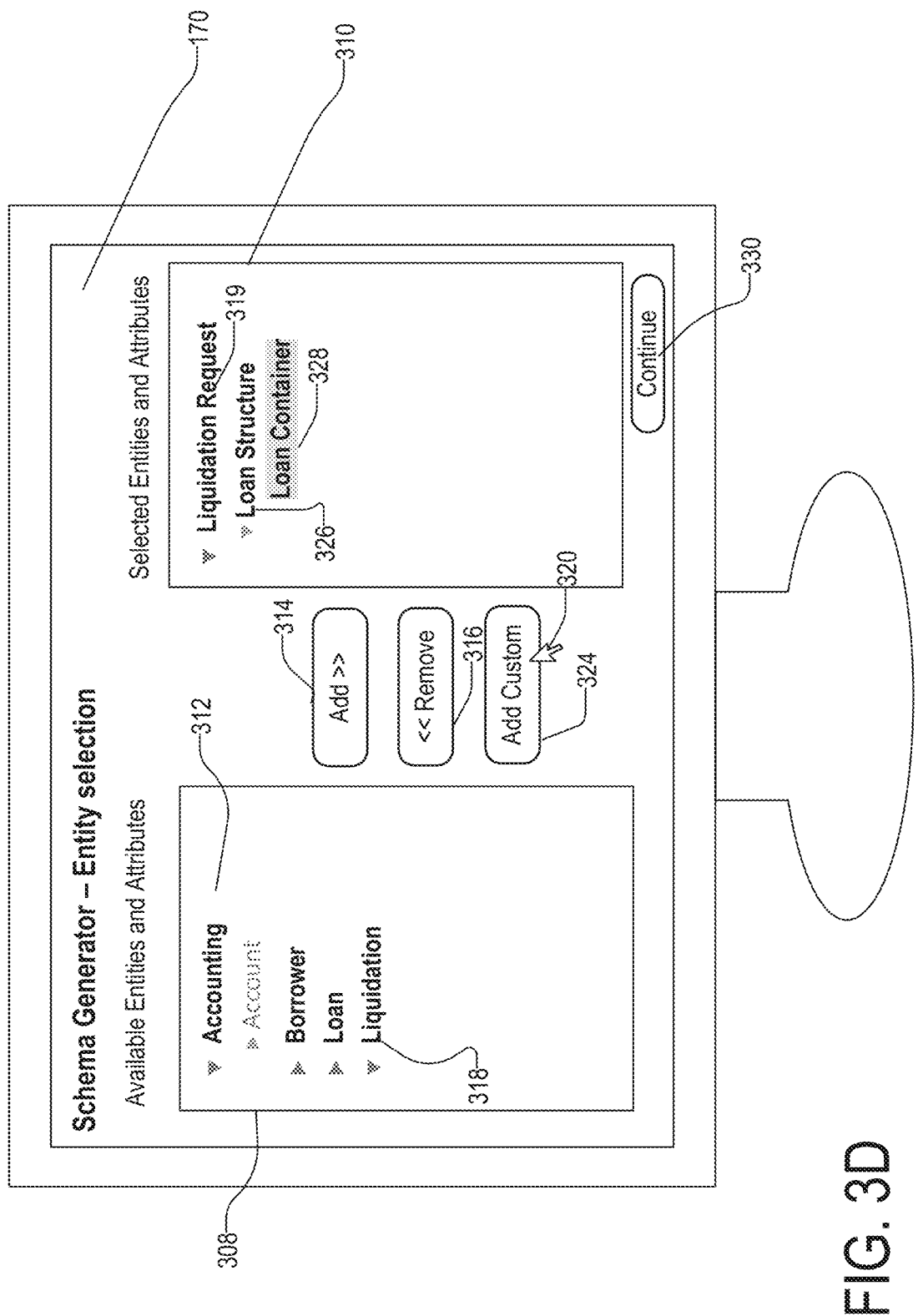

FIG. 3D shows the user interface 170 after a user has selected the Liquidation Request entity 319 for inclusion within the present application container, as shown by the selected entity box 310. In addition, FIG. 3D illustrates that the user has expanded the liquidation request entity 319 to reveal the "Loan Structure" attribute 326 as a child entity, and to show the Loan Structure attribute 326 further including a "Loan Container" attribute 328 as a child entity. For purposes of simplicity, attributes corresponding to variables of the entities described with respect to the present drawings are not shown in the figures.

Figure 3E:
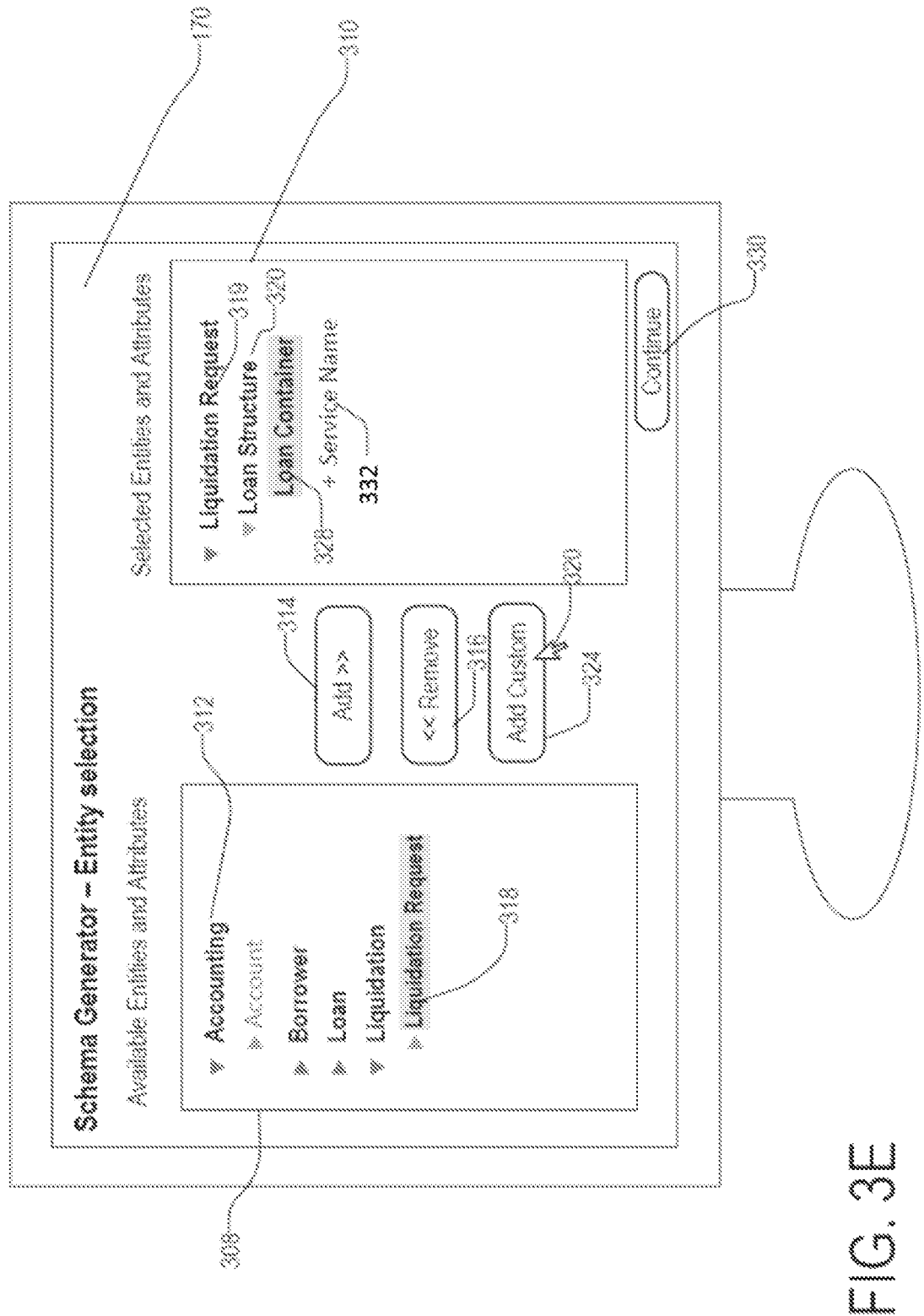

During selection of entities for inclusion within the present application container, a user may also desire to change or customize an entity for a particular purpose (e.g., for a particular application or microservice that the user is creating or programming), for example, by adding an additional attribute for use within the current application container. FIG. 3E shows an illustrative user interface 170 in which a user has added a custom attribute "Service Name" 332 to the loan container entity 328, as shown in the selected entity box 310, using, for example, an "Add Custom" button 324 while having the desired entity selected.

Changes introduced by a user to one or more application containers and/or entities may be tracked using, for example, a timestamp, user information, change information, etc. Such information may be stored in a log file or other suitable structure for auditing of changes made to entities, application containers, etc.

A user may specify any number of custom attributes for an entity selected for inclusion within the present application container. For example, a user may add an attribute having an integer data type and may indicate a data column in a data table of the data model to which the attribute should be mapped via the user interface 170. Alternatively, or in addition, schema attributes may be auto-mapped to source data of a data model via, for example, advanced pattern matching. Mapping module 125 may then create, within the present application container, a mapping between the newly added integer attribute and the selected data column in the data table of the database and/or data model. A user may add any number of custom attributes and they may be of any suitable data type.

Similarly, a user may remove one or more attributes from a selected entity of the present application container. For example, a user may wish to use a reduced or minimized implementation of the loan structure entity 320 if not all of the sub-entities (and their data) are needed by the application or microservice that the user is creating. For instance, the user may remove the loan container entity 328 from the loan structure if the loan container entity 328 (and its data) are not needed by the application or microservice that the user is programming. The removal may be carried out in any suitable manner, for example, a right click and selection of a remove option and/or a remove button (not shown). In response or in conjunction, the mapping module 125 may remove any existing mapping between the removed attribute(s) and/or entity (ies) for the present application container.

When a user has completed selection of one or more entities for addition to the present application container, the application container may be stored in association with the user-selected entities and attributes (operation 212), e.g., in application repository 185. For example, once finished or at a stopping point with the adding and customizing of the application container entities, the user may proceed using the continue button 330, and causing the version control module 130 to save the present application container as a draft application container in the application repository 185. The custom, selected entities and attributes, including custom attributes added or removed by the user and associated mappings, may be stored in the application repository 185 linked with the application container, such that upon future reference, the saved application container may be retrieved as prepared by the user.

Figure 3F:
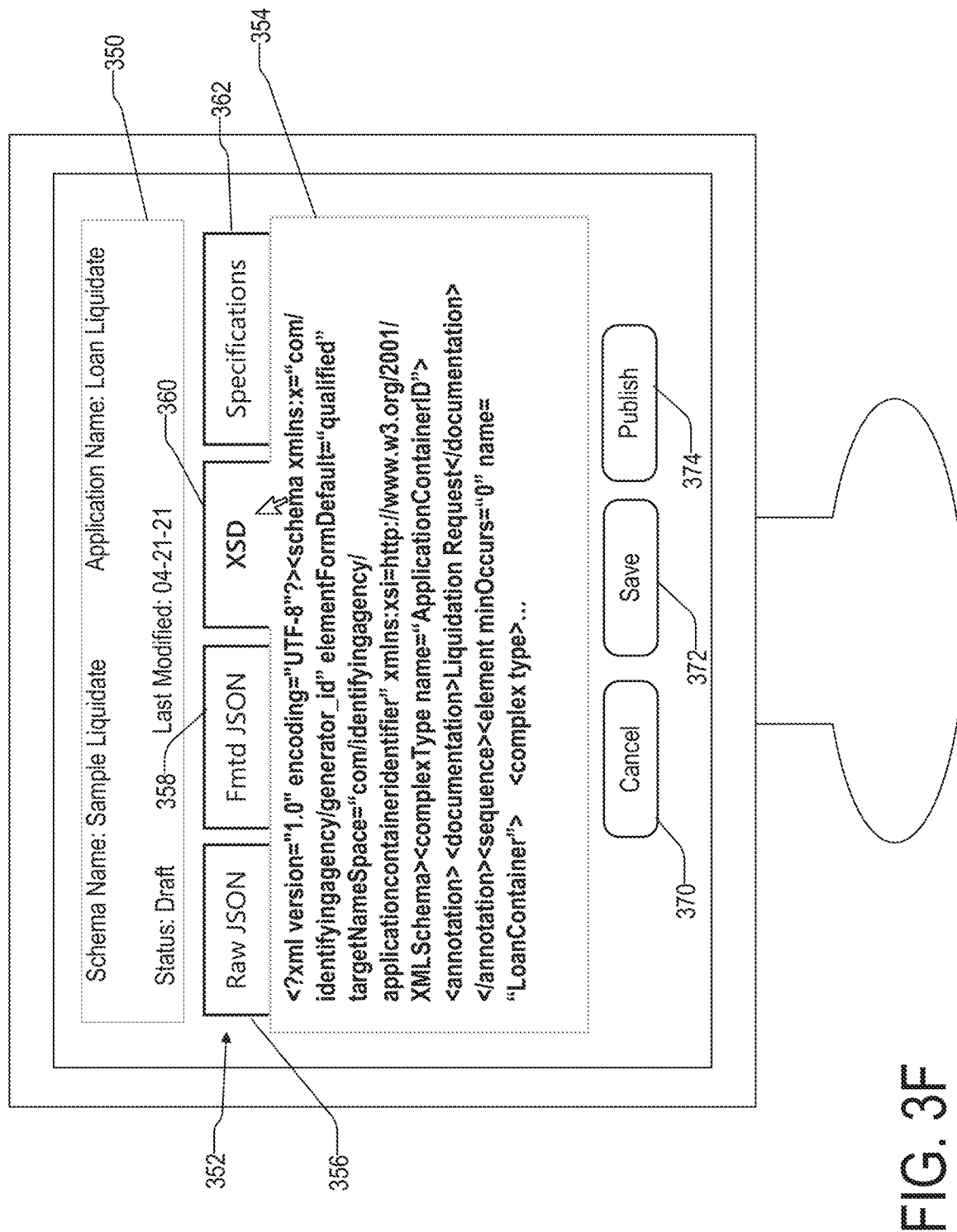

A subsequent request may be received for the application container(s) created as described above, for example, to generate or produce a schema file that corresponds to the application, to view a generated schema, etc. Such a request may include an application container identifier and in some cases, a desired schema format. The user may access the desired application container by making a request via the user interface module 120 to access the desired application container from memory (operation 214). Where the user is in the process of working on an application container and/or schema, the information for the application container may already be available to the system, and the system may produce and present the schema preview display, as shown in the example of FIG. 3F. Alternatively, where the request received indicates or specifies an application container that is not yet loaded from the application repository 185, the system may load the desired application container and display it. For example, the user interface module 120 may receive the user's request and subsequently generate a corresponding request to the appropriate module or repository to obtain or load the desired information. For example, in various embodiments, the request may be or include a request to the application repository 185 via, for example, the version control module 130; a request to obtain the application container and a list of entities associated therewith, a request to the entity collection module 115 to obtain entity information (e.g., metadata, etc.) for each of the associated entities, and/or a request to the mapping module 125 to obtain mapping information related to the attributes of the associated entities, among others.

When the request related to the application container is received via the user interface 170, for example, in the context of a user's desire to review a draft version of a generated schema, a user may be presented with the user interface illustrated in the example shown in FIG. 3F. This display and UI enables the user to visualize a generated schema in any of several different formats, along with identifying information 350 regarding the application container. For example, as shown in FIG. 3F, the identifying information 350 may provide the user with the schema name (Sample Liquidate), the application name (Loan Liquidate), the status of the application being reviewed (Draft), and the date that the information was last modified.

In addition, one or more controls may be provided for receiving a user selection of a schema format from a collection of available formats, for review and/or to obtain additional information regarding the application container and associated entities. For example, a tab control 352 may present a series of tabs from which a user may select a desired schema format (operation 216) (e.g., raw JSON 356, formatted JSON 358, XSD 360, and specifications 362, among others), as well as obtain additional information regarding the application container and entities associated therewith.

As shown at FIG. 3F, the XSD format tab 360 from the tab control 352 has been selected using the cursor 320, thereby indicating that the user requests a schema to be generated in the XSD format. When the user interface module 120 receives the request for the schema including the format selection, the user interface module 120 may instruct the schema generation module 135 to generate a schema based on the entities associated with the application container. (operation 218), and to display the generated schema via the rendering module 140 via the user interface 170, e.g., within a text control window 354.

Any suitable method for generating the schema in the desired format may be implemented by the schema generation module 135. For example, the schema generation module 135 may step through each entity in order of hierarchy based on metadata associated with each entity to determine publicly exposed attributes and mapping information as well as the data types associated with the attributes. As the attributes and data types are identified and assembled, the schema generator may organize the attributes based on the hierarchy and produce the descriptive schema in the desired format using formatting rules associated with the desired format. For example, as shown in FIG. 3F, after generating the requested XSD-format schema, the generation module 135 may provide the generated schema (operation 220) to the rendering module 140 for display to the user in the text control window 354.

According to another example, the schema generation module 135 may be configured to cooperate with a third-party tool for generating the schema in the desired format. For example, the schema generation module 135 may pass the entity and attribute information to an API and/or webservice of the third-party tool, and receive via the API/webservice the schema in the desired format.

The user may also elect to view a generated schema in any other desired format by clicking on the tab corresponding to the desired format. For example, clicking on the raw JSON tab 356 may cause the schema generation module 135 to use the entity and attribute information associated with the application container to generate a JSON version of the schema for review by the user in raw JSON format. One of skill will recognize that any number of formats may be implemented for selection by a user.

Figure 3G:
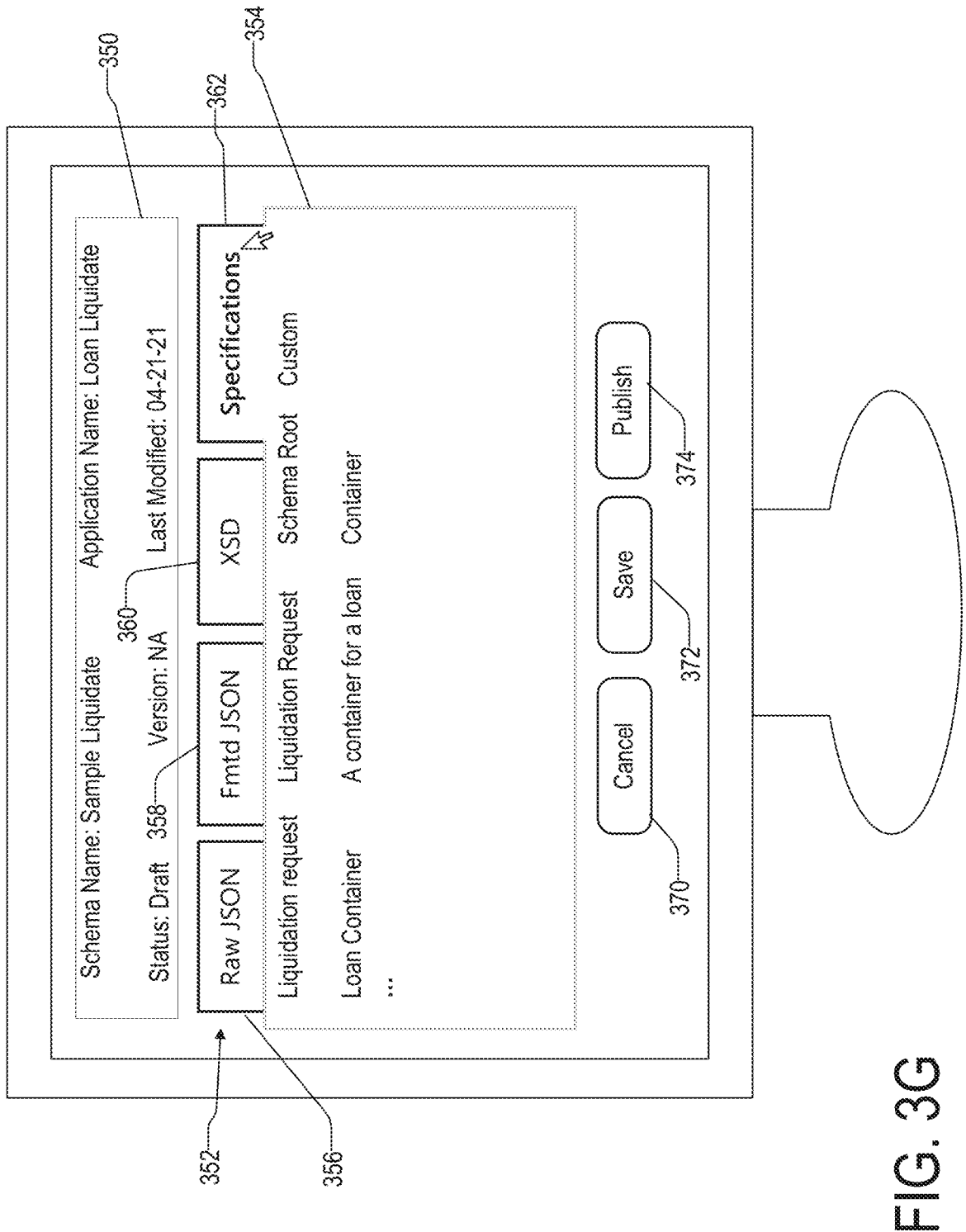

In addition to viewing the schema generated for the application container, the user interface 170 may enable the user to obtain additional information regarding the application container and associated entities. As shown at FIG. 3G, a user may select another tab (e.g., specification tab 362) to obtain information regarding the composition of the schema. For example, a listing of each entity associated with the application container along with a description of the entity may be provided. Additionally, attribute information making up the schema may also be provided along with a description of each attribute of the schema.

According to some embodiments, a user may be enabled to view a hierarchical structure of the underlying data in a graphical form. For example, each entity may be represented in a diagram (not shown) and attributes of each entity shown within the entity in the diagram. A user may "hover" over each entity to obtain additional information regarding that entity. One of skill will recognize that any suitable method for providing additional information regarding entities of the schema may be implemented without departing from the scope of the present disclosure.

When the schema has been finalized in a desired format the user may "save" and/or "publish" the schema, for example, to the application repository 185 in the selected format. For example, following a review of the generated schema the user may activate the save button 372, resulting in the schema being saved to the application repository 185 with a "draft" status. In other words, future modifications of the schema may be made without resulting in a versioning increment for the schema.

Where publication is selected, e.g., via the publish button 374, the schema may be marked as final, timestamped, and assigned a version number by the version control module 130 prior to being saved in the application repository 185. Once saved in the application repository 185 as a versioned schema, the saved, versioned schema may no longer be modified, although it may be copied as a template or incremented as a new version.

In addition, publication of the schema may render the schema available to any third party desiring to develop software implementing an application and/or service that can use the schema. For example, a developer seeking to interface with the application, service, or microservice that uses the schema may obtain a copy of the schema file from the application repository 185. Such a file may have an extension indicating to the selected format for the schema (e.g., .XSD, .JSON, etc.). The requesting party may further request that the schema be provided in a format different from that previously used by the schema creator. For example, a first application developer may desire to have the schema in an XSD format, whereas a second developer may utilize a YAML format for the schema. In such a case, the schema generation module 135 may be called upon to generate the schema in the desired format based on the entities associated with the application container for which the request was made. The generated schema may then be saved to a file with the appropriate extension and provided to the requestor.

Figure 4:
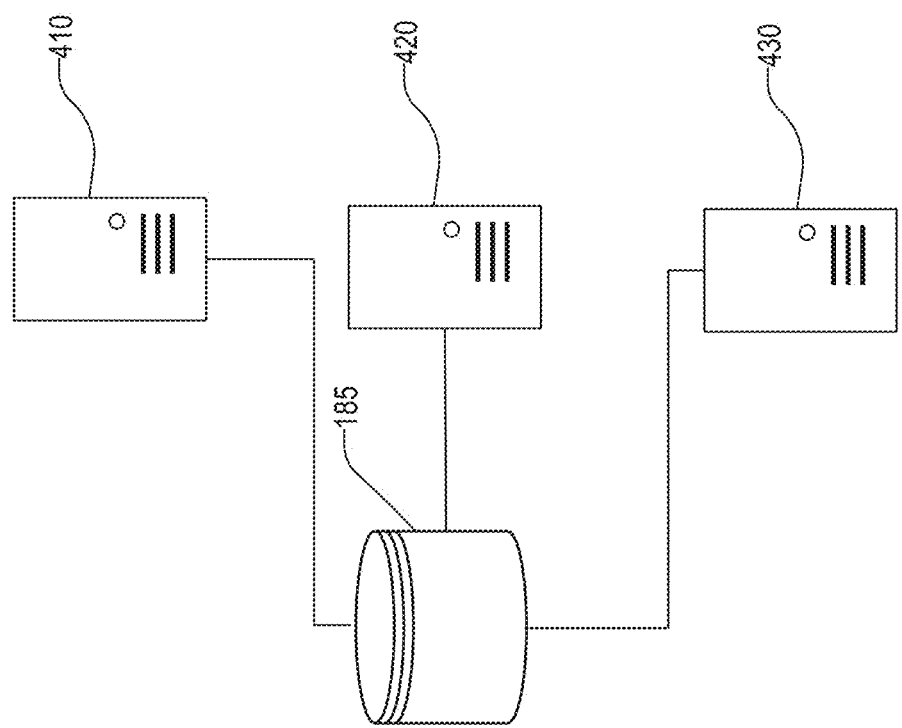
FIG. 4 is a schematic diagram of an implementation of an application repository storing schema according to embodiments of the present disclosure.

FIG. 4 is a schematic diagram of an implementation of an application repository 185 for storing schema according to embodiments of the present disclosure. As shown at FIG. 4, the application repository 185 may be available for accessing published schemas from, for example, applications, services, and microservices running on servers 410, 420, and 430, among others. In addition, the schemas stored by the application repository 185 may further be provided to developers and other interested parties during the development of data-consuming applications and services.

In addition to obtaining a schema in a desired format, a developer or other party may request that source code be generated in a desired language (e.g., Java, C#, etc.), the source code corresponding to the entities of the application container provided in the schema. In response to such a request, the code generation module 145 may be configured to generate code in the desired programming language corresponding to each of the entities in the application container and to provide the generated code to the requestor.

According to some embodiments, the generated source code may be stored in the application repository 185 or other suitable location (e.g., a file system associated with the application repository 185), to enable access to other parties seeking to utilize the application, service, or microservice, to rapidly develop associated code.

In addition to the above, generated schema may be used for generating a database based on the schema. For example, when it is intended to implement a standalone database for use with an application for which the schema was generated (e.g., for testing), the schema may be loaded and used for creation of data tables, column relationships, constraints, etc. within the newly created database.

Figure 5A:
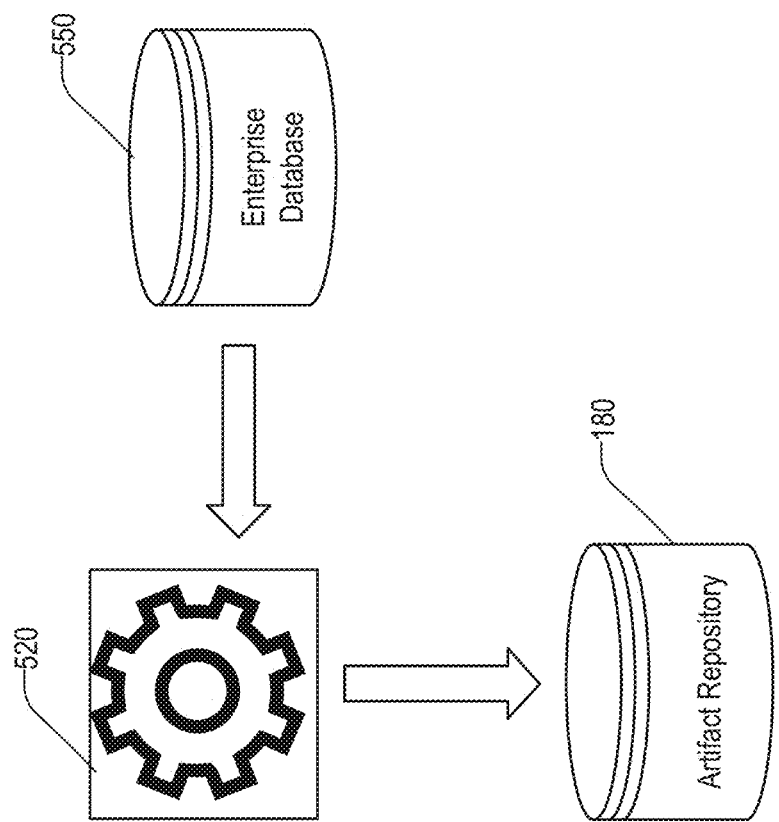
FIG. 5A is a schematic diagram illustrating a system for generating backend repository artifacts according to embodiments of the present disclosure.

FIG. 5A is a schematic diagram illustrating an example of a system for generating backend repository artifacts/entities, while FIG. 5B is a flowchart 551 illustrating an example of a method for generating a backend repository that facilitates schema design. These two figures will be referenced together with regard to the following discussion related to building of the artifact/entity repository 180.

According to embodiments of the disclosure, a database agent 520 may be configured to scan the database(s) 550 (e.g., an enterprise database) to determine new and existing data entities and any changes that have been implemented thereto (operation 552). For example, the database agent 520 may be configured to query a data dictionary and/or system database provided by a relational database management system ("RDBMS") for information related to all accessible databases, data tables, columns, keys, stored procedures, views, etc. stored in the RDBMS. The database agent 520 may further be configured to scan for changes or additions to data mappings within the one or more databases. The database agent 520 may be configured to then compare the results of the scan (i.e., the catalog of entities in the one or more databases) with a stored catalog from a previous scan performed at a predetermined amount of time (e.g., 24 hours prior) prior to the present scan (operation 554). Alternatively, or in addition, the database agent 520 may be configured to compare the results of the present scan with the contents of the entity repository 180. If the database agent 520 determines that no new objects are present (operation 554: No), then the agent 510 may set or reset a scan timer and/or scan flag such that the scan (e.g., 552) may run again after a predetermined interval (e.g., 4, 6, 12, 24, or 48 hours, or the like).

When the database agent 520 determines that one or more changes (e.g., new/modified entities, new/modified attributes, etc.) have been made to the database 550, the database agent 520 may obtain information (e.g., entity information, attribute information, mapping information) from the database 550 regarding the changes (operation 558). For example, where a new entity (e.g., a data table) has been added to the database 550, the database agent 520 may obtain all the columns and datatypes for the columns, as well as key and mapping information for the new entity, and assemble the information into a collection for modification of the entity repository 180 (operation 559).

The database agent 520 may then generate and store any new entities and changes to existing entities (e.g., attributes, mappings, etc.) in the entity repository 180 (operation 560). For example, where a new data table has been identified by database agent 520, the database agent 520 may create a new entity having an identifier similar or identical to the table name in a manner such that the new entity includes attributes and mappings to other data tables/columns corresponding to those obtained by the database agent at 558. The database agent 520 may then store the newly created entity in the entity repository 180 for subsequent access and use during schema generation.

Alternatively, or in addition, the database agent 520 may cooperate with other modules (e.g., the entity collection module 115, the mapping module 125, etc.) to facilitate creation/modification of entities for storage in the entity repository 180.

Figure 6:
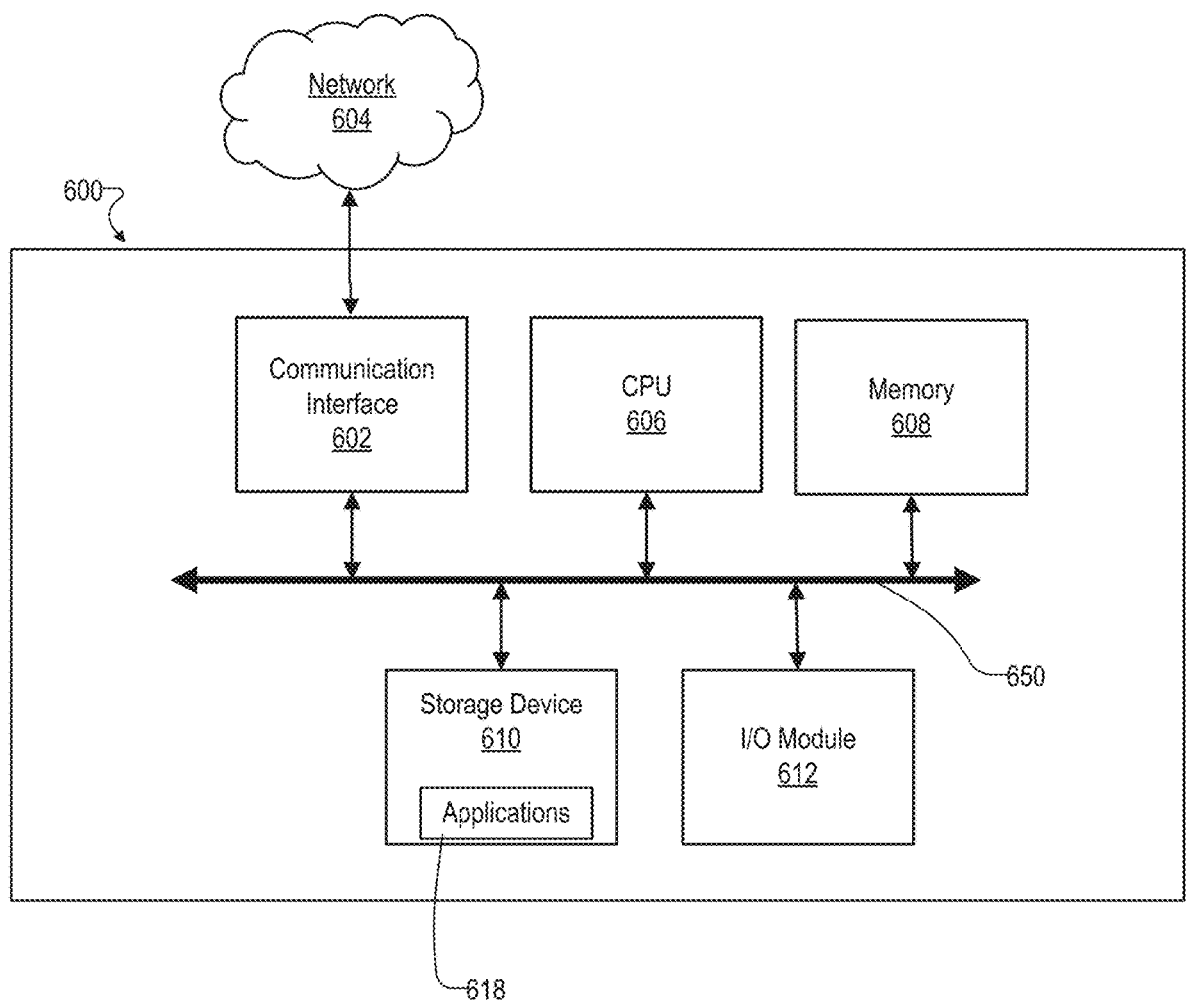
FIG. 6 shows an illustrative computing device that may be implemented according to embodiments of the present disclosure.

FIG. 6 shows an example of a computing device 600 that may be used to implements the systems, devices, processes, and operations described herein. The computing device 600 may include a communication interface 602, a processor 606, a random access memory 608, a storage device 610, and an input/output ("I/O") device 612 communicatively connected via a communication infrastructure 650 (e.g., a bus). While an exemplary computing device 600 is shown in FIG. 6, the components illustrated in FIG. 6 are not intended to be limiting. Additional or alternative components may be used in other embodiments. The components of computing device 600 shown in FIG. 6 will now be described in additional detail.

The communication interface 602 may be configured to communicate with one or more computing devices (not shown) (e.g., via network 604). Examples of a communication interface 602 include, without limitation, a wired network interface (such as a network interface card), a wireless network interface (such as a wireless network interface card), a modem, an audio/video connection, and any other suitable interface.

The processor 606 generally represents any type or form of processing unit capable of processing data or interpreting, executing, and/or directing execution of one or more of the instructions, processes, methods, functions, and/or operations described herein. The processor 606 may direct execution of operations in accordance with one or more applications 618 or other computer-executable instructions such as may be stored in a storage device 610 or another computer-readable medium, for example, memory 608.

The storage device 610 may include one or more data storage media, devices, or configurations and may employ any type, form, and combination of data storage media and/or device. For example, the storage device 610 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 610. For example, data representative of one or more executable applications 618 configured to direct the processor 606 to perform any of the functions, processes, or operations described herein may be stored within the storage device 610. In some examples, the data may be arranged in one or more databases residing within the storage device 610.

The I/O device 612 may be configured to receive user input and provide user output. The I/O device may be used to receive input. The I/O device 612 may include any hardware, firmware, software, or combination thereof supportive of input and output capabilities. For example, the I/O device 612 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

The I/O device 612 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O device 612 is configured to provide graphical data to a display for presentation to a user. The graphical data may be representative of one or more graphical user interfaces and/or any other graphical content as may serve a particular implementation.

Additionally, one or more tools and/or APIs provided by such tools may be implemented for performing certain processes and operations defined in the present disclosure. For example, a first tool providing an API for schema generation may be used in combination with a second tool for performing mapping between entities and/or databases, as described above.

In some embodiments, the application(s) 618 may be or include or implement the modules 115-145 shown in FIG. 1. In some embodiments, there may be more or fewer modules than those noted with regard to FIG. 1. For example, the entity collection module 115 and the user interface module 120 may be combined within a single module, while the mapping module 125, version control module 130, and schema generation module 135 may also be combined into another separate module.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

It is intended that the specification and examples be considered as exemplary only, with a true scope of the disclosure being indicated by the following claims.

What is claimed is:

1. A system comprising:
   a centralized artifact repository storing a plurality of artifacts and metadata characterizing each artifact of the plurality of artifacts;
   a computing device including a processor, a display, and a non-transitory storage medium comprising instructions that when executed by the processor cause the processor to perform operations comprising:
   receiving user input via a user interface indicating at least two application containers;
   merging the at least two application containers to create a new application container responsive to receiving a user selection of a merge control of the user interface;
   obtaining, from the centralized artifact repository, the metadata for one or more artifacts of the plurality of artifacts;
   providing, via the display, the metadata for the one or more artifacts;
   receiving a user selection of an artifact of the plurality of artifacts for inclusion with the new application container;
   storing the new application container in association with the selected artifact in an application repository;
   receiving a schema request related to the new application container;
   receiving a user selection of a schema format from among a plurality of available formats, based on the schema request;
   automatically generating a schema, the schema being in a desired schema format according to the received user selection of the schema format, and being based on the new application container and the artifact associated with the new application container; and
   providing the schema in the desired schema format in response to the schema request.

2. The system of claim 1, wherein each artifact of the plurality of artifacts is defined by one or more attributes mapped to a database, and the metadata for a respective artifact includes information related to the one or more attributes and the mapping.

3. The system of claim 2, wherein the operations further comprise:
   receiving information defining a custom attribute for the selected artifact; and
   automatically mapping the custom attribute to a respective data column of the database for the new application container.

4. The system of claim 2, wherein the operations further comprise:
   receiving information indicating deletion of an attribute from the selected artifact; and
   automatically removing the mapping between the deleted attribute of the selected artifact and the database for the new application container.

5. The system of claim 1, wherein the plurality of available formats comprises two or more of JavaScript Object Notation ("JSON"), extensible markup language ("XML"), Java, microdata, or Resource Description Framework in Attributes ("RDFa").

6. The system of claim 1, wherein the storing comprises:
   receiving an instruction to publish the new application container; and
   assigning a version identifier to the new application container.

7. The system of claim 1, wherein the operations further comprise:
   receiving one or more keywords related to a desired artifact;
   formulating a query using the one or more keywords; and
   obtaining the metadata for one or more artifacts of the plurality of artifacts based on the query.

8. The system of claim 1, wherein the operations further comprise generating source code in a desired language, the source code defining the new application container and the user selected artifact in the desired language.

9. The system of claim 1, wherein receiving the user selection of the artifact comprises dragging and dropping the artifact.

10. The system of claim 1, wherein the operations further comprise:
    receiving a request to provide information regarding one or more of the new application container or the plurality of artifacts; and
    providing at least a portion of the metadata of an artifact in response to the request.

11. A method comprising:
    receiving, via a graphical user interface ("GUI"), user input indicating at least two application containers;
    merging the at least two application containers to create a new application container responsive to receiving a user selection of a merge control of the GUI;
    obtaining, from a centralized artifact repository, metadata associated with one or more artifacts of a plurality of artifacts;
    providing, via the GUI, the metadata for the one or more artifacts;
    receiving, via the GUI, a user selection of an artifact of the plurality of artifacts for inclusion with the new application container;
    storing the new application container in association with the selected artifact in an application repository;
    receiving a schema request related to the new application container;
    receiving a user selection of a schema format from among a plurality of available formats, based on the schema request;
    automatically generating a schema, the schema being in a desired schema format according to the received user selection of the schema format, and being based on the new application container and the artifact associated with the new application container; and
    providing the schema in the desired schema format in response to the schema request.

12. The method of claim 11, wherein each artifact of the plurality of artifacts is defined by one or more attributes mapped to a database, and the metadata for a respective artifact includes information related to the one or more attributes and the mapping.

13. The method of claim 12, further comprising:
receiving information defining a custom attribute for the selected artifact; and
automatically mapping the custom attribute to a respective data column of the database for the new application container.

14. The method of claim 12, further comprising:
receiving information indicating deletion of an attribute from the selected artifact; and
automatically removing the mapping between the deleted attribute of the selected artifact and the database for the new application container.

15. The method of claim 11, wherein the plurality of available formats comprises two or more of JavaScript Object Notation ("JSON"), extensible markup language ("XML"), Java, microdata, or Resource Description Framework in Attributes ("RDFa").

16. The method of claim 11, wherein the storing comprises:
receiving an instruction to publish the new application container; and
assigning a version identifier to the new application container.

17. The method of claim 11, further comprising:
receiving one or more keywords related to a desired artifact;
formulating a query using the one or more keywords; and
obtaining the metadata for one or more artifacts of the plurality of artifacts based on the query.

18. The method of claim 11, further comprising generating source code in a desired language, the source code defining the new application container and the user selected artifact in the desired language.

19. The method of claim 11, wherein receiving the user selection of the artifact comprises dragging and dropping the artifact.

20. The method of claim 11, further comprising:
receiving, via the GUI, a request to provide information regarding one or more of the new application container or the plurality of artifacts; and
providing at least a portion of the metadata of an artifact in response to the request.

* * * * *